3,232,891
PROCESS FOR REMOVING CARBON BLACK FROM POLYETHYLENE
George L. Bata, Montreal, Quebec, Canada, assignor to Union Carbide Canada Limited, Ontario, Canada, a corporation of Toronto
No Drawing. Filed Nov. 3, 1961, Ser. No. 149,846
16 Claims. (Cl. 260—2.3)

This invention relates to a chemical process. More particularly it relates to a process for separating and removing carbon black particles from admixture with polyethylene.

A satisfactory system for removing carbon black from polyethylene would have application in a number of situations. In the production of polyethylene substantial quantities of product fail to meet high quality specifications because of contamination by decomposition products which consist mainly of carbon black. This contaminated off-grade polyethylene must be sold at greatly reduced prices and has limited utility. The process of the present invention provides a commercial feasible method of reclaiming and refining this off-grade material.

For some applications polyethylene is deliberately mixed with carbon black to produce a black polyethylene compound. After fabrication of black polyethylene it is sometimes desirable to process the scrap to remove the carbon black. This can be done with the present invention. The invention also permits analysis of the components of polyethylene-carbon black mixtures where carbon black would normally interfere.

Previous efforts to separate carbon black from polyethylene have not produced a commercially feasible process. Direct filtration of a hot polyethylene-carbon black mixture or of such a mixture dissolved in a solvent is not satisfactory because of the frequently very small size of the carbon black particles (10–20 millimicrons) and because some polyethylene may be filtered off with the carbon black. See Garner et al., Electrophoretic Phenomena in Micronex Dispersions in Organic Liquid Media, J. Inst. Pet., 38, p. 987, 1952, and Raff and Allison, Polyethylene, Interscience Pub. Co., p. 237, 1956. Centrifugal separation of non-precipitated carbon black has also proved unsuccessful. See Damorell et al., Study of Collodial System Carbon Black Dispersions in Hydrocarbons, J. Phys. Chem., 48, p. 125, 1944.

It has been postulated that in some non-polar organic solvents, e.g., toluene, the dispersed carbon black particles are negatively charged. See Garner et al., Detergency of Carbon Blac, J. Inst. Pet., March 1949, August 1951 and December 1952. Based on this fact it has been proposed to apply a potential difference to such a system and thereby cause the particles of carbon black to move in the direction of the positive electrode. However, it has been found that separation by this method of electrophoresis is very slow and incomplete.

I have now discovered a process whereby carbon black particles may be readily and economically separated and removed from admixture with polyethylene. According to the process of my invention a polyethylene carbon black mixture is dissolved in an organic solvent and an acidic coagulant is added, after which the mixture is refluxed. After reflux the coagulated carbon black is readily removed from the solution leaving a clear solution of polyethylene from which polyethylene is readily recovered.

The process of this invention may be applied to polyethylene compositions containing up to about 50 percent by weight of carbon black. Any organic solvent inert to low concentrations of acid may be employed particularly saturated aliphatic hydrocarbons and aromatic hydrocarbons, including compounds such as xylene, toluene, heptane, benzene, carbon tetrachloride, tetrahydrofuran, petrol, diethyl ether, lubricating oil, cyclohexane, amyl acetate trichloroethylene, tetralin, decalin and the like.

The percentage of polyethylene-carbon black mixture dissolved in the solvent is not critical and may be as high as the solvent used will dissolve at the particular temperature employed. Ordinarily commercial grades of polyethylene containing carbon black from which it is desired to remove the carbon black will contain from 0.005 to 20 percent by weight of the carbon black.

The coagulant must be strongly acidic. Coagulants with an ionization constant not less than $1.0 \times 10^{-7}$, particularly mineral acids, are preferred. Suitable coagulants include HCl, LiCl, $AlCl_3$, $H_2SO_4$, HBr, $HNO_3$, $H_3PO_4$ and the like. The normality of the coagulant should be between about 0.05 and 2.0 with 0.1 to 1.5 preferred. From 1 to 25 weight percent of the coagulant solution is added to the polyethylene-carbon black solution with about 5 to 15 weight percent preferred.

Reflux temperature will of course vary according to the particular solvent employed. The time of reflux required for a particular coagulation will be determined by the quantity of carbon black to be removed and the acid used, but will ordinarily be at least 0.25 hour. Separation of the clear polyethylene solution from the coagulated carbon black may be accomplished by any convenient means, for example, filtration, centrifuging and the like.

*Example I*

A total of 0.05 gram of 75 percent by weight polyethylene and 25 percent by weight carbon black was added to 200 milliliters of xylene in a round bottom 500 milliliter flask. This mixture was refluxed for about 30 minutes at a temperature of approximately 140° C. until the polyethylene-carbon black mixture was completely dissolved in xylene.

The solution was then cooled to a temperature of approximately 100° C. and 10 milliliters of N-hydrochloric acid was added. Refluxing was then continued for about 1.25 hours.

After the final reflux the solution was cooled to room temperature and the carbon black particles coagulated and settled from the solution.

*Example II*

A total of 0.10 gram of 75 percent by weight polyethylene and 25 percent by weight carbon black was added to 200 milliliters of toluene in a round bottom 500 milliliter flask. This mixture was refluxed for about 30 minutes at a temperature of approximately 110° C. until the polyethylene-carbon black mixture was completely dissolved in the toluene.

The solution was then cooled to a temperature of approximately 90° C. and 10 milliliters of $N/2$-sulfuric acid was added. Refluxing was then continued for about 1.5 hours.

After the final reflux the solution was cooled to room temperature and the carbon black particles coagulated and settled from the solution.

*Example III*

A total of 0.02 gram of 98.2 percent by weight polyethylene and 1.8 percent by weight carbon black was added to 200 milliliters of n-heptane in a round bottom 500 milliliters flask. This mixture was refluxed for about 20 minutes at a temperature of approximately 100° C. until the polyethylene-carbon black mixture was completely dissolved in the n-heptane.

Twenty milliliters of N/2-sulfuric acid was added to the solution and refluxing was then continued for about 1.5 hours.

After the final reflux the solution was cooled to room temperature and a sample was transferred to a Beckman DU spectrophotometer cell. Transmittance versus time readings were recorded and a value of 76.2 percent was noted after 10 minutes. This contrasted with only 57.2 percent transmittance after 10 minutes for a similar polyethylene-carbon black solution without any acid added.

*Example IV*

A total of 0.02 gram of 75 percent by weight polyethylene and 25 percent by weight carbon black was added to 200 milliliters of n-heptane in a round bottom 500 milliliter flask. This mixture was refluxed for about 30 minutes at a temperature of approximately 100° C. until the polyethylene-carbon black mixture was completely dissolved in the n-heptane.

The solution was then cooled to a temperature of approximately 75° C. and 20 milliliters of N-hydrochloric acid was added. Refluxing was then continued for about 1.25 hours.

After final reflux the solution was cooled to room temperature and a sample was transferred to a Beckman DU spectrophotometer cell. Transmittance versus time readings were recorded and a value of 86.7 percent was noted after 10 minutes. This contrasted with only 57.2 percent transmittance after 10 minutes for similar polyethylene-carbon black solution without any acid added.

What is claimed is:

1. Process for separating carbon black from admixture with polyethylene which comprises dissolving polyethylene containing carbon black in an organic solvent, adding to the thus formed solution a mineral acid type coagulating agent having an ionization constant not less than $1.0 \times 10^{-7}$, heating said solution at reflux temperature and then separating the thus formed coagulate of carbon black from said solution, with substantially all of said polyethylene remaining in said solution.

2. Process for separating carbon black from admixture with polyethylene which comprises dissolving polyethylene containing carbon black in an organic solvent, adding to the thus formed solution a mineral acid type coagulating agent having an ionization constant not less than $1.0 \times 10^{-7}$ and selected from the group consisting of $HCl$, $H_2SO_4$, $HNO_3$, $H_3PO_4$, $AlCl_3$, $HBr$ and $LiCl$, heating said solution at reflux temperature and then separating the thus formed coagulate of carbon black from said solution, with substantially all of said polyethylene remaining in said solution.

3. Process for separating carbon black from admixture with polyethylene which comprises dissolving polyethylene containing carbon black in an organic solvent, adding to the thus formed solution as a mineral acid type coagulating agent HCl having an ionization constant not less than $1.0 \times 10^{-7}$, heating said solution at reflux temperature and then separating the thus formed coagulate of carbon black from said solution, with substantially all of said polyethylene remaining in said solution.

4. Process for separating carbon black from admixture with polyethylene which comprises dissolving polyethylene containing carbon black in an organic solvent, adding to the thus formed solution as a mineral acid type coagulating agent $H_2SO_4$ having an ionization constant not less than $1.0 \times 10^{-7}$, heating said solution at reflux temperature and then separating the thus formed coagulate of carbon black from said solution, with substantially all of said polyethylene remaining in said solution.

5. Process for separating carbon black from admixture with polyethylene which comprises dissolving in an organic solvent from 0.005 to 20 percent by weight of polyethylene containing carbon black, adding to the thus formed solution a mineral acid type coagulating agent having an ionization constant not less than $1.0 \times 10^{-7}$, heating said solution at reflux temperature and then separating the thus formed coagulate of carbon black from said solution, with substantially all of said polyethylene remaining in said solution.

6. Process for separating carbon black from admixture with polyethylene which comprises dissolving polyethylene containing carbon black in a saturated aliphatic hydrocarbon solvent, adding to the thus formed solution a mineral acid type coagulating agent having an ionization constant not less than $1.0 \times 10^{-7}$, heating said solution at reflux temperature and then separating the thus formed coagulate of carbon black from said solution, with substantially all of said polyethylene remaining in said solution.

7. Process for separating carbon black from admixture with polyethylene which comprises dissolving polyethylene containing carbon black in an aromatic hydrocarbon solvent, adding to the thus formed solution a mineral acid type coagulating agent having an ionization constant not less than $1.0 \times 10^{-7}$, heating said solution at reflux temperature and then separating the thus formed coagulate of carbon black from said solution, with substantially all of said polyethylene remaining in said solution.

8. Process for separating carbon black from admixture with polyethylene which comprises dissolving polyethylene containing carbon black in an organic solvent selected from the group consisting of xylene, toluene, heptane, benzene, carbon tetrachloride, tetralin, cyclohexane and decalin, adding to the thus formed solution a mineral acid type coagulating agent having an ionization constant not less than $1.0 \times 10^{-7}$, heating said solution at reflux temperature and then separating the thus formed coagulate of carbon black from said solution, with substantially all of said polyethylene remaining in said solution.

9. Process for separating carbon black from admixture with polyethylene which comprises dissolving polyethylene containing carbon black in heptane, adding to the thus formed solution a mineral acid type coagulating agent having an ionization constant not less than $1.0 \times 10^{-7}$, heating said solution at reflux temperature and then separating the thus formed coagulate of carbon black from said solution, with substantially all of said polyethylene remaining in said solution.

10. Process for separating carbon black from admixture with polyethylene which comprises dissolving polyethylene containing carbon black in xylene, adding to the thus formed solution a mineral acid type coagulating agent having an ionization constant not less than $1.0 \times 10^{-7}$, heating said solution at reflux temperature and then separating the thus formed coagulate of carbon black from said solution, with substantially all of said polyethylene remaining in said solution.

11. Progress for separating carbon black from admixture with polyethylene which comprises dissolving polyethylene containing carbon black in an organic solvent, adding to the thus formed solution from 1 to 25 percent by weight of a mineral acid type coagulating agent having an ionization constant not less than $1.0 \times 10^{-7}$, heating said solution at reflux temperature and then separating the thus formed coagulate of carbon black from said solution, with substantially all of said polyethylene remaining in said solution.

12. Process for separating carbon black from admixture with polyethylene which comprises dissolving polyethylene containing carbon black in an organic solvent, adding to the thus formed solution from 5 to 15 percent by weight of a mineral acid type coagulating agent having an ionization constant not less than $1.0 \times 10^{-7}$, heating said solution at reflux temperature and then separating the thus formed coagulate of carbon black from said solution, with substantially all of said polyethylene remaining in said solution.

13. Process for separating carbon black from admixture with polyethylene which comprises dissolving polyethylene containing carbon black in an organic solvent, adding to the thus formed solution a mineral acid type coagulating agent having an ionization constant not less than $1.0 \times 10^{-7}$ and a normality from 0.05 to 2, heating said solution at reflux temperature and then separating the thus formed coagulate of carbon black from said solution, with substantially all of said polyethylene remaining in said solution.

14. Process for separating carbon black from admixture with polyethylene which comprises dissolving polyethylene containing carbon black in an organic solvent, adding to the thus formed solution a mineral acid type coagulating agent having an ionization constant not less than $1.0 \times 10^{-7}$, heating said solution at reflux temperature for at least 0.25 hour and then separating the thus formed coagulate of carbon black from said solution, with substantially all of said polyethylene remaining in said solution.

15. Process for separating carbon black from admixture with polyethylene which comprises dissolving polyethylene containing carbon black in an organic solvent, adding to the thus formed solution a mineral acid type coagulating agent having an ionization constant not less than $1.0 \times 10^{-7}$, heating said solution at reflux temperature and then separating the thus formed coagulate of carbon black from said solution by filtration, with substantially all of said polyethylene remaining in said solution.

16. Process for separating carbon black from admixture with polyethylene which comprises dissolving polyethylene containing carbon black in an organic solvent, adding to the thus formed solution a mineral acid type coagulating agent having an ionization constant not less than $1.0 \times 10^{-7}$, heating said solution at reflux temperature and then separating the thus formed coagulate of carbon black from said solution by centrifuging, with substantially all of said polyethylene remaining in said solution.

References Cited by the Examiner
UNITED STATES PATENTS

| | | | |
|---|---|---|---|
| 2,455,714 | 12/1948 | Waterman et al. | 260—821 |
| 2,945,020 | 7/1960 | Hall | 260—33.6 |
| 3,043,785 | 7/1962 | Wright et al. | 260—2.3 |

OTHER REFERENCES

Goodwin, "Coloring Polyethylene," Modern Plastics, August 1954, pp. 104–105.

MURRAY TILLMAN, *Primary Examiner.*

LEON J. BERCOVITZ, *Examiner.*

W. L. BASCOMB, R. C. STEWART, *Assistant Examiners.*